US006647517B1

United States Patent
Dickey et al.

(10) Patent No.: US 6,647,517 B1
(45) Date of Patent: Nov. 11, 2003

(54) APPARATUS AND METHOD FOR PROVIDING ERROR ORDERING INFORMATION AND ERROR LOGGING INFORMATION

(75) Inventors: Kent Andrew Dickey, Westford, MA (US); James Curtis Farmer, Sunnyvale, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 09/561,599

(22) Filed: Apr. 27, 2000

(51) Int. Cl.[7] .............................................. G06F 11/00
(52) U.S. Cl. ........................................ 714/48; 714/25
(58) Field of Search ..................................... 714/48, 25

(56) References Cited

U.S. PATENT DOCUMENTS

| | | | | |
|---|---|---|---|---|
| 4,935,685 A | * | 6/1990 | Justus et al. ................. | 318/798 |
| 5,155,731 A | * | 10/1992 | Yamaguchi .................... | 714/45 |
| 5,295,258 A | * | 3/1994 | Jewett et al. .................. | 714/12 |
| 5,774,647 A | * | 6/1998 | Raynham et al. .............. | 714/48 |
| 5,778,387 A | * | 7/1998 | Wilkerson et al. ........... | 707/202 |
| 5,941,996 A | * | 8/1999 | Smith et al. ................... | 714/47 |
| 6,253,243 B1 | * | 6/2001 | Spencer ....................... | 709/224 |
| 6,353,902 B1 | * | 3/2002 | Kulatunge et al. .......... | 714/712 |
| 6,434,715 B1 | * | 8/2002 | Andersen ..................... | 714/39 |

* cited by examiner

*Primary Examiner*—Robert Beausoliel
*Assistant Examiner*—Michael Maskulinski

(57) ABSTRACT

An apparatus and method using a set of registers for indicating multiple error levels in a data processing system, recording information for each error level, and providing an order register to allow software or a user to determine the sequence order in which errors occurred. One embodiment of the invention involves a method for indicating errors in a data processing system with multiple error levels, indicating that an error corresponds to an error level, representing the error with a set of memory cells, and recording the order in which the error has occurred. A second embodiment of the invention involves a data processing system, including a primary error log to record an error, and at least one error logging register that can record information about the error. A third embodiment of the invention involves an error log system, including a primary error log to record an error having a corresponding error level, an error logging register corresponding to one of a plurality of error levels to record information about the error, and an error order register to record information about the order of occurrence of the error.

21 Claims, 6 Drawing Sheets

100

| PRIMARY ERROR LOG REGISTER | | | | | | |
|---|---|---|---|---|---|---|
| RESERVED 102 | E27 110 | E26 112 | E25 114 | E24-E2 116 | E1 118 | E0 120 |

| SECONDARY ERROR LOG REGISTER | | | | | | |
|---|---|---|---|---|---|---|
| RESERVED 102 | E27 110 | E26 112 | E25 114 | E24-E2 116 | E1 118 | E0 120 |

FIG. 2

| ORDER REGISTER | | | | | | | |
|---|---|---|---|---|---|---|---|
| UNUSED | COUNTER ERROR BITS 27-24 | ADVISORY ERROR BITS 23-20 | CORRECTABLE ERROR BITS 19-16 | UNCORRECTABLE ERROR BITS 15-12 | FATAL ERROR BITS 11-8 | COMPONENT FAIL ERROR BITS 7-4 | DEADLOCK ERROR BITS 3-0 |
| 302 | 304 | 306 | 308 | 310 | 312 | 314 | 316 |

| UNUSED | COUNTER | ADVISORY ERROR | CORRECTABLE ERROR | UNCORRECTABLE ERROR | FATAL ERROR | COMPONENT FAIL ERROR | DEADLOCK ERROR |
|---|---|---|---|---|---|---|---|
| | BITS 27-24 "0002" | BITS 23-20 "0002" | BITS 19-16 "0002" | BITS 15-12 "0000" | BITS 11-8 "0001" | BITS 7-4 "0002" | BITS 3-0 "0002" |
| 302 | 304 | 306 | 308 | 310 | 312 | 314 | 316 |

ORDER REGISTER

APPARATUS AND METHOD FOR PROVIDING ERROR ORDERING INFORMATION AND ERROR LOGGING INFORMATION

BACKGROUND OF THE INVENTION

1. Field of the Invention

This invention relates generally to an improvement in error logging, and more specifically to providing error ordering information and extensive error logging information for errors occurring in a data processing system.

2. Description of the Prior Art

Many data processing systems (e.g., computer systems, programmable electronic systems, telecommunication switching systems, control systems, and so forth) detect different types of errors. Some errors indicate a minor problem while other errors indicate a serious problem. Because data processing systems are being designed to offer higher percentages of "up-time," it is critical to know how severe an error is and whether the system must be shut down to limit data corruption, or if the system can continue to operate without impact to the user.

These are some typical error levels of severity:

(1) An advisory error does not interrupt normal operations and is recorded only for informational purposes.
(2) A correctable error is an error that can be corrected by hardware or software and which is logged.
(3) An uncorrectable error is an error that may require some software help to keep the error contained and keep the system running.
(4) A fatal error is an error that can cause data corruption if the data processing system or subsystem is not halted immediately.
(5) A component failure is a catastrophic failure of a system component, such as a disk memory.
(6) A deadlock failure occurs when two or more processes are competing for the same resource and these processes cannot proceed to completion because the resource is unavailable.

There have been several ways to log and report errors in data processing systems. One type of prior art solution is to provide a single register holding the encoded status of the first, most severe error. In this system, a low severity error could be logged, but if a higher severity error occurs before the log is read, the higher severity error log information will overwrite the lower severity error log information. And in typical prior art systems, no ordering or address information is recorded in the error register to allow software or users to determine the sequence in which multiple errors have occurred. Such ordering and address information would be desirable to allow software or users to determine whether errors are genuine, or merely consequential artifacts of an earlier, genuine error. For example, a genuine error can produce multiple consequential errors of lesser or greater severity, that can overwrite or overwhelm the information concerning the earlier, genuine error. It can require considerable analysis time to determine that one or more consequential errors are unimportant artifacts of a genuine error.

It would be desirable to have the capability to record extensive information about errors, including address information and the sequence in which the errors occurred.

SUMMARY OF THE INVENTION

An object of the invention is to provide the capability to record extensive information about errors, including address information and the sequence in which the errors occurred.

A first aspect of the invention is directed to a method for indicating errors in a data processing system with a plurality of error levels. The method includes steps indicating that an error corresponds to an error level of the plurality of error levels, representing the error with a set of memory cells, and recording the order in which the error has occurred.

A second aspect of the invention is directed to a data processing system, having an error and an associated error level chosen from a plurality of error levels. The data processing system or error log system include a set of memory cells, with a primary error log to record the error, and at least one error logging register that can record information about the error.

A third aspect of the invention is directed to an error log system, including a set of registers to record an error corresponding to one of a plurality of error levels, including a primary error log to record at least one error having a corresponding error level, an error logging register corresponding to one of a plurality of error levels to record information about the error, and an error order register to record information about the order of occurrence of the error.

These and other objects and advantages of the invention will become apparent to those skilled in the art from the following detailed description of the invention and the accompanying drawings.

BRIEF DESCRIPTION OF THE DRAWINGS

FIG. 1 shows one register that is used for the primary error log, which will log the first occurrence of the most severe error that occurred.

FIG. 2 shows a second register that is used for the secondary error log, which will indicate all additional errors with a severity level equal to or less than the most severe error that has occurred since the last time the error log registers were cleared.

FIG. 3 shows an order register that is used to provide ordering information to determine the sequence of occurrence of errors of various error severity levels.

FIG. 4 shows a more detailed example of the bit fields in the order register shown in FIG. 3 after a fatal error and an uncorrectable error have occurred.

DETAILED DESCRIPTION OF PREFERRED EMBODIMENTS OF THE INVENTION

Figure 5:
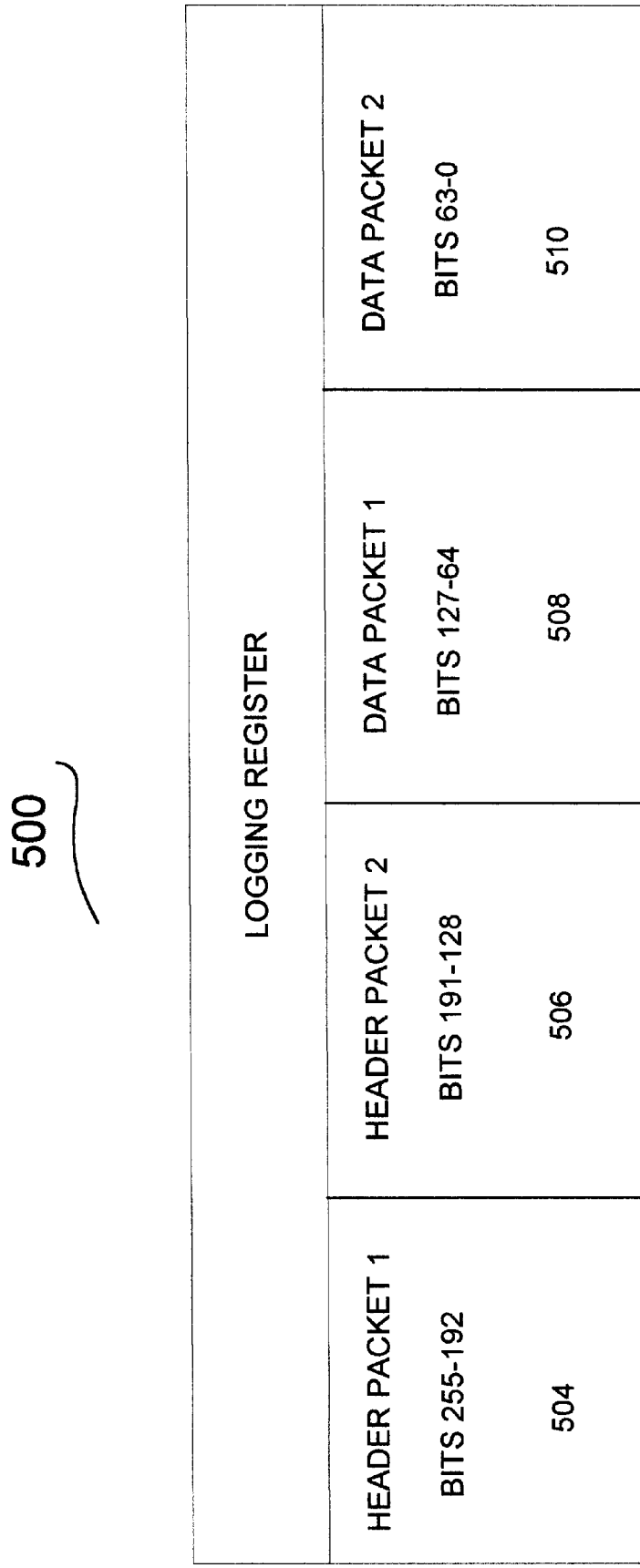
FIG. 5 shows a logging register that records the header packets and some data packets of a transaction in which an error has occurred.

This invention provides a method and apparatus for providing extensive error logging information and ordering of errors occurring in a data processing system. This allows a determination of the sequence in which the various errors occurred. Furthermore, the extensive error logging information, such as the address at which an error occurred, assists software in correcting correctable errors and containing uncorrectable errors.

In a preferred embodiment of the invention, there are multiple sets of registers for logging errors. Preferably, the number of sets corresponds to the number of sub-unit communication interfaces where errors can occur and errors can be isolated by software. Each register will have enough bits (preferably at least 16 bits and typically 32 bits or 64 bits) to indicate the number of types of errors that can occur in the communication interface. Since each set of registers is similar in function, one set will be described.

FIG. 1 shows one register that is used for the primary error log 100, which will log the first occurrence of the most severe error that occurred. In one preferred embodiment, the primary error log 100 has a unique bit for each error. In this example, there is a reserved field 102 and there are 28 bits for 28 unique errors, such as (E27) 110, (E26) 112, (E25) 114, (E24–E2) 116, (E1) 118, and (E0) 120. In one embodiment of the invention, the error bits can be grouped in adjacent bits according to their severity level. In another embodiment of the invention, the error bits can be grouped according to some other criteria, e.g., physical location of the errors.

The primary error log 100 will usually have no error bits set or only one error bit set in a group of error bits having the same error severity level. In preferred embodiments of the invention, successive errors of the same error severity level will be recorded in a secondary error log discussed below. Thus, it is possible for errors in all six levels of error severity to be set in the primary error log 100, such as when an advisory error, a correctable error, an uncorrectable error, a fatal error, a component failure error, and a deadlock error are detected. Alternative embodiments of the invention could use the primary error log 100 to record only the first most severe error.

FIG. 2 shows a second register that is used for the secondary error log 200, which will indicate all additional errors with a severity level equal to or less than the most severe error that has occurred since the last time the error log registers were cleared. In one preferred embodiment, the secondary error log 200 has a unique bit for each error. In this example, there is a reserved field 102 and there are 28 bits for 28 unique errors, such as (E27) 110, (E26) 112, (E25) 114, (E24–E2) 116, (E1) 118, and (E0) 120. In a preferred embodiment of the invention, the error bits are identically arranged in both the primary error log 100 and secondary error log 200. However, identical arrangement of the error bits is not a requirement of the invention. Both the secondary error log 200 and the primary error log 100 can be implemented with flip-flops, latches, random access memory, or programmable memory, such as flash memory.

The secondary error log 200 will set an error bit when an error has occurred, and an error of the same or higher severity level has already been logged in the primary error log 100. This includes errors that occur again. This will allow software to determine all the errors that were detected, not just the first error detected. This can provide extremely useful information for successfully debugging a data processing system.

Errors can be reported with encoded bits or with individual, dedicated bits. But in preferred embodiments of the invention, each error is reported with an individual bit, as shown in FIGS. 1–2. Each unique type of error has a corresponding bit in each of the primary error log and secondary error log registers. This allows firmware or diagnostic software to directly determine exactly which type of error occurred without decoding delay, and this avoids transitory error bit states that might be erroneously interpreted as the actual errors. For example, erroneous interpretation is possible if the data processing system fails completely in a very sudden event, and one or more transitory error bits are frozen at incorrect states in diagnostic registers that are later read after recovery from the failure.

FIG. 3 shows an order register 300 that is used to provide ordering information to determine the sequence of occurrence of errors of various error severity levels. In one preferred embodiment of the invention, order register 300 has an unused field 302, a four-bit field for the counter 304, a four-bit field 306 for the advisory errors, a four-bit field 308 for the correctable errors, a four-bit field 310 for the uncorrectable errors, a four-bit field 312 for the fatal errors, a four-bit field 314 for the component failure errors, and a four-bit field 316 for the deadlock errors. The counter 304 counts the number of errors that have occurred for all six types of error severity levels. The bit field for each error severity level duplicates the value of the counter 304, until an error of that specific error severity level has occurred. Then the bit field for that error severity level is frozen at a value equal to the counter value before the counter value is incremented to indicate that an error occurred. Alternative embodiments of the invention can use alternative schemes to increment or decrement an arbitrary counter value, and transfer the counter value to the appropriate bit fields of error severity levels in indicate the sequence in which various types of errors occurred.

FIG. 4 shows a more detailed example of the bit fields in the order register 300 shown in FIG. 3 after a fatal error and an uncorrectable error have occurred. For example, if the first error is an uncorrectable error, four-bit field 310 is frozen at a value of 0 to indicate that this type of error was the first error. Then if the second error is a fatal error, four-bit field 312 is frozen at a value of 1 to indicate that this type of error was the second error. Since no other types of errors have occurred, the counter value of 2 is duplicated in four-bit field 306 for the advisory errors, four-bit field 308 for the correctable errors, four-bit field 314 for the component failure errors, and four-bit field 316 for the deadlock errors.

FIG. 5 shows a logging register 500 that records the header packets and some data packets of a transaction in which an error has occurred in the data processing system. In preferred embodiments of the invention, there is a logging register 500 to record the header and data packets for each error severity level. For example, if there are six levels of error severity, then are six logging registers. In one preferred embodiment of the invention, each logging register 500 holds address and data information from an integer number of packets. In one preferred embodiment of the invention, each logging register 500 can contain at least one header packet with address information and at least one data packet with data information. However, a transaction can consist of two header packets, followed by some number of data packets. Therefore, a more preferred embodiment uses logging registers that can contain two header packets and two data packets. For example, if each header packet and data packet is 64-bits long, then a 256-bit long logging register 500 could hold two header packets in fields 504 and 506, and two data packets in fields 508 and 510, respectively. As another example, if each header packet and data packet is 72-bits long, then a 288-bit long logging register could hold two 72-bit header packets and two 72-bit data packets. The logging register 500 and the previously discussed order register 300 can be implemented with flip-flops, latches, random access memory, or programmable memory, such as flash memory.

Figure 6:
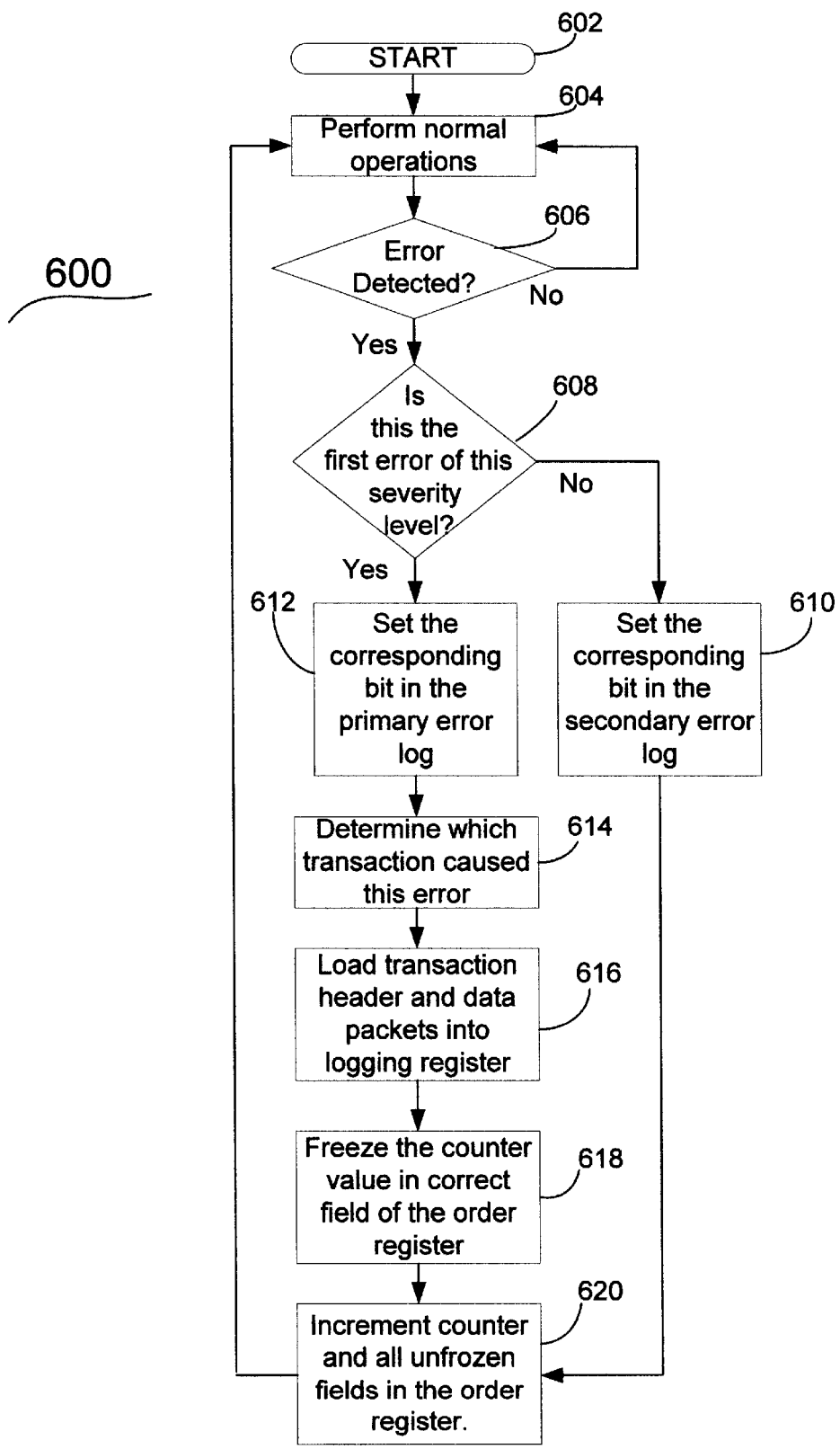
FIG. 6 illustrates a flow chart of a method for using a primary error log and a secondary error log in accordance with one embodiment of the present invention.

FIG. 6 illustrates a flow chart 600 of a method for using a primary error log and a secondary error log in accordance with one embodiment of the present invention. The method starts in operation 602. In operation 604, the data processing system performs normal data processing system processing tasks with a possibility of encountering errors associated with the processing tasks or even errors that are not directly associated with a present processing task. In operation 606, a test is made to determine if an error occurred. If no error has occurred, then operation 604 is next. If an error occurred, then operation 608 is next, where a test is made to determine if this is the first occurrence of an error of this error severity. If this error is not the first occurrence of an error of this severity level since the error logs were cleared, then in operation 610 the error is logged in the secondary error log, and operation 620 is next. However, if it is the first occurrence of an error of this severity level, operation 612 is next, where the error is logged in the primary error log. In operation 614, the specific transaction being processed when this error occurred is determined. In operation 616, the corresponding header and data packets of the transaction are loaded into the logging register. In operation 618, the counter value is transferred to the bit field of the order register that corresponds the error severity level of this error the error is logged in the primary error log repeated. Then in operation 620, the counter value is incremented by one and all unfrozen bit fields in the order register are updated with the incremented counter value. If an unfrozen bit field of the order register has the same value as the incremented counter value, then this will indicate that no error of this error severity level has yet occurred. Operation 604 is next, where the data processing system resumes performance of normal operations until the next error occurs.

If it is time to clear the error logs, a central processing unit (CPU) reads the error log information, performs any appropriate actions, and transfers the information to an appropriate destination, such as a disk memory, a printer for print out, or some other kind of peripheral device. The CPU clears the error logs when the information is no longer useful and the error logs would be more usefully employed in recording data processing system errors by recording any errors that occur during a new session.

Figure 7:
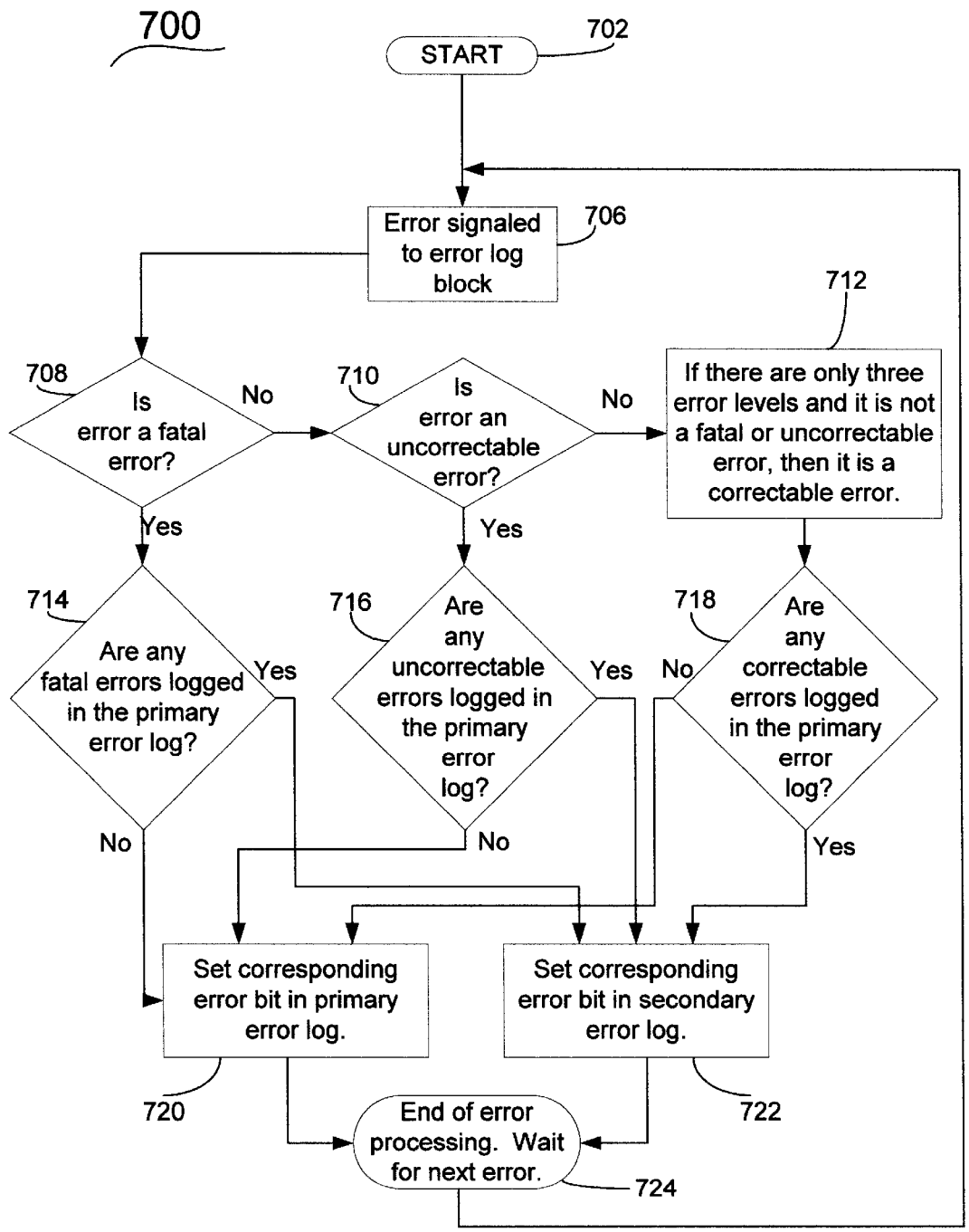
FIG. 7 illustrates a more detailed flow chart of the method illustrated in FIG. 6 and shows how corresponding error bits are set in a primary error log and a secondary error log in accordance with one embodiment of the present invention.

FIG. 7 illustrates a more detailed flow chart 700 of the method illustrated in FIG. 6 and shows how corresponding error bits are set in a primary error log and a secondary error log in accordance with one embodiment of the present invention. In order to simplify the discussion and facilitate an understanding of the invention, this example concerns an embodiment of the invention with only three error severity levels: fatal, uncorrectable, and correctable. A flow chart of an alternative embodiment of the invention that records errors having less than or more than three error severity levels can be created by simple modification of flow chart 700.

The method starts in operation 702. In operation 706, an error is signaled to the error log block. The bit field for the corresponding error severity level in the order register is set to the value of the counter before the counter value is incremented. The logging register for the corresponding error severity level records some or all of the header packet and data packet information for the transaction in which the error occurred. In operation 708, a test is performed to determine if the error is a fatal error. If the error is a fatal error, in operation 714 a test is performed to determine if there are any fatal errors logged in the primary error log. If there are no fatal errors logged in the primary error log, then in operation 720 a corresponding error bit is set in the primary error log, in operation 724 the error processing ends, and operation 706 is next. If the test of operation 714 determines that there is a fatal error logged in the primary error log, then operation 722 is next, where the corresponding error bit is set in the secondary error log. Then in operation 724 the error processing ends, and operation 706 is next.

If the test of operation 708 determines that the error is not a fatal error, then operation 710 is next, where a test is performed to determine if the error is an uncorrectable error. If the error is an uncorrectable error, then operation 716 is next, where a test is performed to determine if there are any uncorrectable errors logged in the primary error log. If there are no uncorrectable errors logged, then in operation 720 the corresponding error bit is set in the primary error log, the error processing ends in operation 724, and operation 706 is next. If there is an uncorrectable error, then in operation 722 the corresponding error bit is set in the secondary error log, the error processing ends in operation 724, and operation 706 is next.

If the test of operation 710 determines that the error is not an uncorrectable error, then operation 712 is next, because if the error is not fatal and is not uncorrectable, then the error is a correctable error. Operation 718 is next, where a test is performed to determine if there are any correctable errors logged in the primary error log. If there are no correctable errors logged in the primary error log, then in operation 720 the corresponding error bit is set in the primary error log, the error processing ends in operation 724, and operation 706 is next. If there is a correctable error, then in operation 722 the corresponding error bit is set in the secondary error log, the error processing ends in operation 724, and operation 706 is next.

Preferred embodiments of the invention also provide the extremely useful feature of indicating simultaneous errors, such as when multiple errors of multiple error severity levels occur at virtually the same time. Simultaneous errors frequently occur, and are typically related, but the prior art provided no mechanism to easily detect and diagnose simultaneous errors. The occurrence of simultaneous errors is indicated by equal counter values in the bit fields of multiple error severity levels in the order register. Alternative embodiments can also indicate simultaneous errors within the same error severity level by providing a bit field for each unique error within one or more error severity levels in the order register.

The most preferred embodiment of the invention uses registers to implement the error logs and the other error registers. However, alternative embodiments of the invention can use other types of volatile or non-volatile memory cells (e.g., discrete flip-flops, discrete latches, random access memory, magnetic memory, or programmable memory, such as flash memory) to implement one or more of the error logs, the order register and the logging registers. In one preferred embodiment of the invention, there is a primary error log, a secondary error log, and an error order register. In an alternative embodiment, there is only a primary error log and an error order register. Furthermore, one preferred embodiment uses logging registers to record additional information for each error severity level, such as the header packets and data packets of the transaction in which an error occurred. For example, if the data processing system has six levels of error severity, then there would be six logging registers. Moreover, alternative embodiments can use more than one order register, with any arbitrary number of logging registers, even using an order register and a logging register for each unique type of error. Alternative embodiments can even use a number of registers less than the number of error levels, such as by using one register to record information for more than one error level.

The exemplary embodiments described herein are for purposes of illustration and are not intended to be limiting. Therefore, those skilled in the art will recognize that other embodiments could be practiced without departing from the scope and spirit of the claims set forth below.

What is claimed is:

1. A method for indicating errors in a data processing system with a plurality of error levels, comprising the steps of:
   indicating that an error corresponds to an error level of said plurality of error levels;
   representing said error by storing a value in a set of memory cells of a primary error log;
   representing said error by storing said value in a second set of memory cells of a secondary error log when said error is not stored in said primary error log; and
   recording the order in which said error has occurred.

2. The method of claim 1, wherein said step of representing said error with a set of memory cells further includes recording information about a transaction that caused said error in at least one of a plurality of error logging registers, and each of said plurality of error logging registers corresponds to one of said plurality of error levels.

3. The method of claim 2, wherein said step of representing said error with a set of memory cells further includes recording information concerning said error in at least one of said plurality of error logging registers.

4. The method of claim 1, wherein said step of representing said error with a set of memory cells further includes defining said error with an error level selected from the group consisting of an advisory error level, a correctable error level, an uncorrectable error level, a fatal error level, a component failure error level, and a deadlock error level.

5. The method of claim 1, wherein said step of recording the order in which said error has occurred further includes freezing a counter value in a bit field of an order register having a plurality of bit fields.

6. The method of claim 5, wherein said step of recording the order in which said error has occurred further includes incrementing said counter value and copying said incremented counter value into at least one bit field of said plurality of bit fields of said order register.

7. The method of claim 1, wherein said step of recording the order in which said error has occurred further includes indicating the substantially simultaneous occurrence of a plurality of errors by freezing a counter value in a corresponding plurality of bit fields of at least one order register.

8. A data processing system, having an associated error level chosen from a plurality of error levels for an error, comprising:
   a set of memory cells, including;
      a primary error log to record said error;
      at least one error logging register that can record information about said error;
      a secondary error log wherein said error is recorded when said error is not recorded in said primary error log; and
      at least one order register for recording a sequence of the occurrence of said error.

9. The data processing system of claim 8, further including a plurality of error logging registers, each of said plurality of error logging registers corresponding to one of said plurality of error levels.

10. The data processing system of claim 9, wherein at least one of said plurality of error logging registers records transaction information.

11. The data processing system of claim 8, further comprising an order register to record the order of occurrence of said error.

12. The data processing system of claim 11, wherein said order register further comprises a variable value bit field, a plurality of order bit fields, and any of said plurality of order bit fields is configured to copy said variable counter value and freeze said variable counter value at a fixed value to indicate said error occurred.

13. The data processing system of claim 12, wherein said order register is configured to copy said variable counter value and freeze said variable counter value at a fixed value to indicate the substantially simultaneous occurrence of a plurality of errors.

14. An error log system, including a set of registers to record an error corresponding to one of a plurality of error levels, comprising:
   a primary error log to record at least one error having a corresponding error level;
   an error logging register corresponding to one of a plurality of error levels, said error logging register recording information about said error;
   an error order register to record information about the order of occurrence of said error; and
   a secondary error log for indicating said error when said error is not recorded in said primary error log.

15. The error log system of claim 14, further including a plurality of error logging registers, each of said plurality of error logging registers corresponding to one of said plurality of error levels.

16. The error log system of claim 15, wherein at least one of said plurality of error logging registers records transaction information related to said error.

17. The error log system of claim 14, wherein said error order register includes a variable counter value bit field, a plurality of order bit fields, and any of said plurality of order bit fields is configured to copy said variable counter value and freeze said variable counter value at a fixed value to indicate said error occurred.

18. The error log system of claim 17, wherein said error order register is configured to copy said variable counter value and freeze said variable counter value at a fixed value in a plurality of bit fields to indicate the substantially simultaneous occurrence of a corresponding plurality of errors.

19. The error log system of claim 14, wherein said plurality of error levels includes an error level selected from the group consisting of an advisory error level, a correctable error level, and uncorrectable error level, a fatal error level, a component failure error level, and a deadlock error level.

20. A method for indicating errors in a data processing system with a plurality of error levels comprising:
   indicating that an error corresponds to an error level of said plurality of error levels;
   storing a value in a primary error log when a first occurrence of said error occurs;
   storing a value in a secondary error log when said error is not recorded in said primary error log; and
   recording the order in which said error has occurred.

21. The method as recited in claim 20, wherein said indicating comprises:
   defining said error with an error level selected form the group consisting of and advisory error level, a correctable error level, and uncorrectable error level, a fatal error level, a component failure error level, and a deadlock error level.

* * * * *

UNITED STATES PATENT AND TRADEMARK OFFICE
CERTIFICATE OF CORRECTION

PATENT NO. : 6,647,517 B1
DATED : November 11, 2003
INVENTOR(S) : Kent Andrew Dickey et al.

It is certified that error appears in the above-identified patent and that said Letters Patent is hereby corrected as shown below:

<u>Column 8,</u>
Line 61, delete "form" and insert therefor -- from --

Signed and Sealed this

Eighth Day of February, 2005

JON W. DUDAS
*Director of the United States Patent and Trademark Office*